United States Patent Office 2,965,659
Patented Dec. 20, 1960

2,965,659

PREPARATION OF FLUORINE CONTAINING ORGANIC COMPOUNDS

George V. D. Tiers, St. Paul, Minn., assignor to Minnesota Mining & Manufacturing Company, St. Paul, Minn., a corporation of Delaware No Drawing. Filed Sept. 6, 1955, Ser. No. 532,743

20 Claims. (Cl. 260—408)

This invention relates to a novel method for the synthesis of fluorocarbon-radical-containing organic compounds and to novel compounds thus provided.

Since they contain fluorocarbon radicals, the organic compounds resulting from the processes of this invention are particularly useful for their characteristic surface-active properties. The fluorocarbon radical imparts resistance to wetting by both oil and water. Since the compounds may contain a wide variety of other radicals in addition to the fluorocarbon radical, and the latter may be widely varied in chain length and configuration, the compounds are found to be useful in a great number of applications, including surface coatings or treatments, polymers, waxes, hydraulic fluids, solvents, etc.

The novel method of this invention involves combining fluorocarbon sulfonyl chlorides or bromides with olefins which are capable of copolymerization with another olefin under free-radical initiation, and which contain at least one hydrogen atom attached to an olefinic carbon atom, the remaining three valences of the olefinic carbon atoms being satisfied by radicals having Hammett sigma (para) parameter values whose algebraic sum is not greater than about +0.4. The reaction proceeds by a free-radical mechanism in the presence of a free-radical initiator such as ultraviolet light or suitable organic peroxides, and with the liberation of sulfur dioxide. Olefins which contain efficient chain-terminating groups, such as mercapto or 2,5-dihydroxyphenyl groups, are incapable of copolymerization as above specified, and are therefore excluded.

The concept of Hammett sigma (para) parameter values is fully explained by H. H. Jaffe in Chemical Reviews, volume 53 (1953), beginning at page 191, particularly at pages 219–233, wherein are provided numerical values for a large number of substituent radicals. The article also provides the basis on which such numerical values may be derived. The article, and information contained or referred to therein, is included here by reference.

The following specific examples will serve to illustrate the principles of the invention.

EXAMPLE 1

Three grams of 1-octene ($CH_2=CHC_6H_{13}$) was mixed with 6.2 grams of perfluoro-4-ethylcyclohexanesulfonyl chloride in an open test tube and the mixture was subjected to irradiation from a quartz mercury arc lamp for 15 hours. Sulfur dioxide was evolved. The reaction mixture was fractionally distilled. There was obtained a colorless liquid product in 80% yield based on the amount of fluorocarbon sulfonyl chloride consumed in the reaction. The compound boiled at 154° C. under a reduced pressure of 25 mm. Hg, had a refractive index $n_D^{25}=1.3731$, and on analysis showed the following:

| Analysis, percent | C | F | Cl |
|---|---|---|---|
| Calcd. for $C_{16}H_{16}F_{15}Cl$ | 36.3 | 54.0 | 6.72 |
| Found | 36.5 | 54.0 | 6.9 |

The reaction is therefore believed to be properly shown as follows:

$$4\text{—}C_2F_5\text{—}c\text{—}C_6F_{10}\text{—}SO_2Cl + CH_2=CHC_6H_{13} \rightarrow$$
$$4\text{—}C_2F_5\text{—}c\text{—}C_6F_{10}CH_2CHClC_6H_{13} + SO_2$$

The —$C_6H_{13}$ alkyl group is closely similar to the —$C_4H_9$ group which has a Hammett sigma (para) parameter value of −0.161.

EXAMPLE 2

A mixture of 35 grams of 10-hendecenoic acid and 98 grams of perfluorooctanesulfonyl chloride was heated under reflux to 130–145° C. while slowly adding 1.6 grams of ditertiary butyl peroxide over a period of several hours. Sulfur dioxide was evolved and the mixture darkened. Vacuum distillation yielded a white solid boiling at 190–204° C./0.5 mm. Hg and, after recrystallization from ethyl ether at subzero temperatures, melting at 82–83° C. Total yield was 79% based on the amount of sulfonyl chloride consumed.

| Analysis, percent | C | F | Cl |
|---|---|---|---|
| Calcd. for $C_{19}H_{26}F_{17}ClO_2$ | 35.8 | 50.6 | 5.56 |
| Found | 35.7 | 50.7 | 5.58 |

The indicated reaction is therefore:

$$C_8F_{17}SO_2Cl + CH_2=CH(CH_2)_8COOH \rightarrow$$
$$C_8F_{17}CH_2CHCl(CH_2)_8COOH + SO_2$$

Infra-red analysis confirmed this product structure. The —$(CH_2)_8COOH$ carboxyalkyl group has a Hammett sigma (para) parameter value close to the values for —$C_4H_9$ (−0.161) and —$CH_2CH_2COOH$ (−0.066).

EXAMPLE 3

A mixture of 3.2 grams of cyclohexene, 20.8 grams of normal perfluorooctanesulfonyl chloride, and 0.3 gram of di-tertiary butyl peroxide was sealed in a glass ampoule and heated for 18 hours at 145° C. Unreacted materials were removed by vacuum distillation. Fractionation of the remainder yielded a colorless liquid product boiling at 166° C./60 mm. Hg and having a refractive index $n_D^{25}=1.3580$.

| Analysis, percent | C | F | Cl |
|---|---|---|---|
| Calcd. for $C_{14}H_{10}F_{17}Cl$ | 31.4 | 60.2 | 6.61 |
| Found | 31.2 | 60.2 | 6.59 |

Accordingly, the reaction is believed to be properly represented as follows:

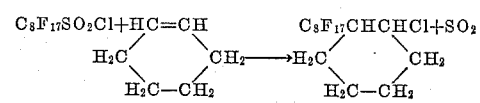

The alkylene group joining the two olefinic carbons of cyclohexene does not, strictly speaking, have a sigma (para) value. The value given is −0.477. The sigma (para) values given for two ethyl groups total −0.301. The required value for the cyclohexene must be of this same order of magnitude.

EXAMPLE 4

A mixture of 7.0 grams of allyl chloride, 15.4 grams of perfluoromethanesulfonyl chloride and 0.5 gram of di-tertiary butyl peroxide was heated in an ampoule for 20 hours at 145° C. There was obtained a first product boiling at 49° C./60 mm. Hg and having a refractive index of 1.3892; a second product boiling at 141° C./60 mm. and having a refractive index of 1.4378, and a nonvolatile residue. Analysis of the first two products was as follows:

| First product, analysis, percent | C | F | Cl |
|---|---|---|---|
| Calcd. for $C_5H_5F_3Cl_2$ | 26.5 | 31.5 | 39.2 |
| Found | 26.8 | 30.6 | 40.0 |
| Second product | | | |
| Calcd. for $C_7H_{10}F_3Cl_3$ | 32.7 | 22.1 | 39.8 |
| Found | 33.0 | 22.4 | 40.5 |

The reactions are believed to be properly shown as follows:

$$CF_3SO_2Cl + CH_2=CHCH_2Cl \longrightarrow CF_3CH_2CHClCH_2Cl + SO_2$$

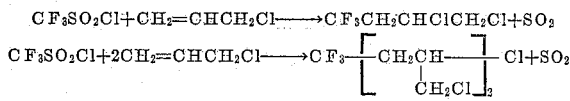

The first product is thus shown to be an adduct of the two reactants in 1:1 molecular proportion, whereas the second product is a telomeric adduct of the two reactants in 1:2 molecular proportion. The third product, on the same basis, is a mixture of telomers of still higher ratio.

The haloalkyl group of allyl chloride has a sigma (para) value of +0.184.

Additional examples are given in the following tables.

The free-radical initiator employed is indicated in the table, suitably abbreviated, as ultraviolet light, di-tertiary butyl peroxide, or benzoyl peroxide. Any of the usual initiators of free-radical reactions are applicable.

The —$CH_2OH$ hydroxyalkyl group of Example 8 has a sigma (para) value of much the same magnitude as the chloromethyl group of Example 4, namely, about +0.184.

The —$CH_2NHCOCF_3$ acylaminoalkyl group of Example 9 is also similar to the chloromethyl group in sigma (para) value.

The olefin of Example 10 contains an acyloxyalkyl group having a sigma (para) value similar to that of the chloromethyl group.

Example 11 provides a combination of methyl and carboxyl groups on the carbon atoms of the olefin; these groups have sigma (para) values of —0.170 and +0.265 respectively, the algebraic total thus being +0.095.

*Table II.—Products*

| Ex. | Formula | B.P., °C. | $n_D^{25}$ | C | F | Cl |
|---|---|---|---|---|---|---|
| 5 | $CF_3CH_2CHClC_6H_{13}$ | 103/60 | 1.3935 | 50.0 / 50.5 | 26.3 / 25.4 | 16.4 / 16.5 |
| 6 | $C_8F_{17}CH_2CHClCH_2Cl$ | 143/60 | 1.3458 | | | 13.4 / 14.5 |
| 7 | $C_2F_5$-c-$C_6F_{10}CH_2CHClCH_2Cl$ | 139/60 | 1.3698 | 24.6 / 27.4 | 57.8 / 55.5 | 14.4 / 14.4 |
| 8a | $C_8F_{17}CH_2CHClCH_2OH$ | 126/20 | | 25.75 / 25.5 | 63.0 / 62.6 | 6.92 / 7.00 |
| 8b | $C_8F_{17}[CH_2CH(CH_2OH)]_2Cl$ | | | | | 5.8 / 6.2 |
| 9 | $C_8F_{17}CH_2CHClCH_2NHCOCF_3$ | (1) | (1) | (1) | (1) | (1) |
| 10 | $CF_3CH_2CHClCH_2OCOCH_3$ | 96/60 | 1.3844 | 35.3 / 34.6 | 27.9 / 28.0 | 17.3 / 16.8 |
| 11 | $C_8F_{17}CH(CH_3)CHClCOOH$ | (2) | (2) | (2) | (2) | (2) |
| 12 | $CF_3CHCHCl$ / $H_2C$ $CH_2$ / $H_2C-CH_2$ | 83–85/60 | 1.4121 | 45.1 / 45.4 | 30.6 / 30.3 | 19.0 / 18.9 |
| 13 | $C_2F_5$-c-$C_6F_{10}CHCHCl$ / $H_2C$ $CH_2$ / $H_2C-CH_2$ | 139/25 | 1.3812 | 33.8 / 34.0 | 57.2 / 56.1 | 7.1 / 7.4 |

[1] M. ca 68° C.; percent N, calcd. 2.31, found 2.25.
[2] Indicated by infra-red and chlorine analysis.

In Table II the percentages of carbon, fluorine and chlorine are reported first as calculated from the formula given. Below that value is presented the percentage of the element found on analysis. The boiling point is given in degrees C. at the indicated pressure in mm. of mercury.

Under the conditions employed, the olefinic reactants in many instances exhibit a strong tendency to homo-

*Table I.—Reactants*

| Ex. | Reactant A | Wt. | Reactant B | Wt. | Initiator | Wt. |
|---|---|---|---|---|---|---|
| 5 | $CF_3SO_2Cl$ | 5.0 | $CH_2=CHC_6H_{13}$ | 6.6 | UVL | |
| 6 | $C_8F_{17}SO_2Cl$ | 20.8 | $CH_2=CHCH_2Cl$ | 3.0 | t Bu Per | 0.3 |
| 7 | 4-$C_2F_5$-c-$C_6F_{10}SO_2Cl$ | 9.6 | $CH_2=CHCH_2Cl$ | 3.0 | Bz Per | 0.5 |
| 8 | $C_8F_{17}SO_2Cl$ | 100.0 | $CH_2=CHCH_2OH$ | 11.2 | t Bu Per | 0.8 |
| 9 | $C_8F_{17}SO_2Cl$ | 20.8 | $CH_2=CHCH_2NHCOCF_3$ | 6.1 | t Bu Per | 0.5 |
| 10 | $CF_3SO_2Cl$ | 13.5 | $CH_2=CHCH_2OCOCH_3$ | 8.0 | t Bu Per | 0.4 |
| 11 | $C_8F_{17}SO_2Cl$ | 18.1 | $CH_3CH=CHCOOH$ | 3.0 | t Bu Per | 0.3 |
| 12 | $CF_3SO_2Cl$ | 5.0 | cyclopentene (HC=CH / $H_2C$ $CH_2$ / $H_2C-CH_2$) | 32.7 | UVL | |
| 13 | 4-$C_2F_5$-c-$C_6F_{10}SO_2Cl$ | 3.0 | cyclopentene (HC=CH / $H_2C$ $CH_2$ / $H_2C-CH_2$) | 1.0 | UVL | | polymerize. Evidence of this tendency is found in the recovery of small amounts of telomeric products containing a single fluorocarbon radical combined with up to fifty or more olefin residues. The addition of the olefinic reactant in small proportions to the reaction mixture lessens the formation of telomeric products and increases the yield of the 1:1 adduct. The olefin is desirably added to the perfluoro alkanesulfonyl chloride under reflux and at a rate just sufficient to maintain the vapor temperature in the reaction vessel at a point above the boiling point of the olefin but well below the boiling point of the corresponding perfluoroalkyl chloride. In all cases, the reaction proceeds with liberation of sulfur dioxide and formation of significant proportions of 1:1 adduct, together with formation, in most instances, of telomeric adducts including the 1:2 adduct.

The reaction involved is conveniently expressed, in general terms, as follows:

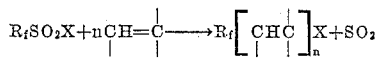

where $R_f$ is a perfluoroalkyl radical, X is chlorine or bromine, $n$ is an integer, and the remaining valences of the olefiic carbon atoms are attached to radicals having Hammett sigma (para) parameter values with an algebraic total not higher than about +0.4. In the equation given, the addition of the $R_f$ radical is shown as occurring at the carbon atom of the olefinic bond to which the hydrogen atom is atached, i.e., in a position alpha to the hydrogen. It may be that much beta-addition of $R_f$ also occurs, and therefore it is not desired to be limited, as regards alpha or beta position of the fluorocarbon radical, to the specific structure here indicated. Rather it is suggested that these structural formulas should be understood as indicating the most probable structure of the majority of the product obtained and corresponding to the empirical formula.

Additional substituted hydro-olefins which also are reactive with perfluoro alkanesulfonyl chlorides or bromides in accordance with the principles of this invention include:

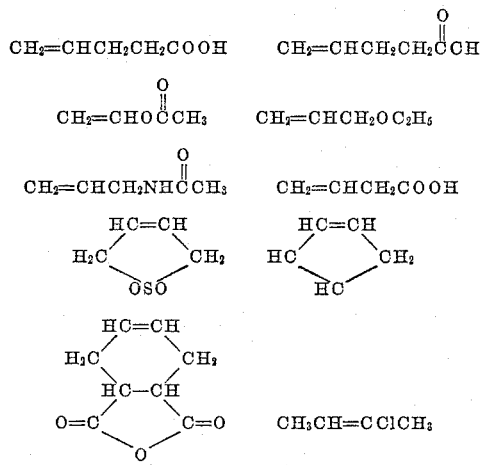

and

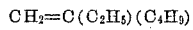

Analogous reactions have also been carried out between perfluoroalkyl sulfonyl chloride and the compound $CH_2OHC{\equiv}CCH_2OH$.

Each of these compounds contain substituents on the olefinic carbon atoms which may be shown to have Hammett sigma (para) parameter values having an algebraic total not greater than, and in most cases much less than, +0.4.

On the other hand, substituted olefins with Hammett sigma (para) parameter values totaling more than about +0.4 have been found to be inoperable for the purposes of this invention. One such compound is vinylidene chloride, $CH_2{=}CCl_2$; the total of its sigma parameter values is +0.454. Another ismaleic anhydride. The value for maleic acid is +0.530; and the value for the anhydride, although not directly obtainable from the above-indicated source, is reasonably assumed to be even higher than that for the acid.

As one illustrative example of a type of application for which the novel compounds of this invention are particularly useful, the adduct of n-perfluorooctanesulfonyl chloride and 10-hendecenoic acid was esterified with vinyl alcohol by mixing with six-fold molar excess of vinyl acetate in acid solution and in the presence of catalytic amounts of mercuric acetate. The ester, containing 5.4% chlorine, was polymerized in the presence of acetyl peroxide to form a hard, opaque wax-like product having excellent resistance to wetting by both water and oil.

What is claimed is as follows:

1. The method which comprises reacting together, in the presence of a free-radical initiator, perfluorocarbon sulfonyl halide in which the halide atom is selected from the class consisting of chlorine and bromine, and an olefin, capable of copolymerization with another olefin under free radical initiation, having at least one hydrogen atom attached to an olefinic carbon atom, free of chain-terminating radicals, and having the remaining valences of the olefinic carbon atoms satisfied by a combination of radicals having Hammett sigma (para) parameter values whose algebraic sum is not greater than about +0.4, with liberation of sulfur dioxide and formation of a perfluorocarbon-radical-containing substituted organic compound having the general structure

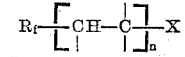

where $R_f$ is a perfluorocarbon radical, X is selected from the class consisting of chlorine and bromine, and $n$ is an integer not greater than about 50.

2. The method of claim 1 in which X is chlorine.

3. The method which comprises adding an olefin capable of copolymerization with another olefin under free radical initiation, having at least one hydrogen atom attached to an olefinic carbon atom, and free of chain-terminating radicals, to a perfluorocarbon sulfonyl chloride in the presence of a free-radical initiator and at a rate corresponding to the rate of reaction, with liberation of sulfur dioxide and formation of a perfluorocarbon-radical-containing substituted organic compound having the general structure

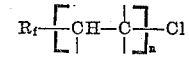

where $R_f$ is a perfluorocarbon radical and $n$ is an integer not greater than about 50, the remaining valences of the olefinic carbon atoms being satisfied by a combination of radicals having Hammett sigma (para) parameter values whose algebraic sum is not greater than about +0.4.

4. As a novel compound, a perfluorocarbon-radical-containing organic compound having the formula

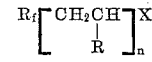

where $R_f$ is perfluorocarbon, X is selected from the class consisting of chlorine and bromine, $n$ is an integer not greater than about 50, and R is an alkyl group.

5. As a novel compound, a perfluorocarbon-radical-containing organic compound having the formula

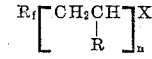

where $R_f$ is perfluorocarbon, X is selected from the class consisting of chlorine and bromine, $n$ is an integer not greater than about 50, and R is a haloalkyl group.

6. As a novel compound, a perfluorocarbon-radical-containing organic compound having the formula

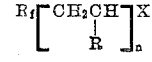

where $R_f$ is perfluorocarbon, X is selected from the class consisting of chlorine and bromine, n is an integer not greater than about 50, and R is a hydroxyalkyl group.

7. As a novel compound, a perfluorocarbon-radical-containing organic compound having the formula

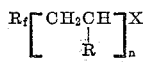

where $R_f$ is perfluorocarbon, X is selected from the class consisting of chlorine and bromine, n is an integer not greater than about 50, and R is an alkylene carboxylic acid group.

8. As a novel compound, a perfluorocarbon-radical-containing organic compound having the formula

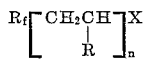

where $R_f$ is perfluorocarbon, X is selected from the class consisting of chlorine and bromine, n is an integer not greater than about 50, and R is an acyloxyalkyl group.

9. As a novel compound, a perfluorocarbon-radical-containing organic compound having the formula

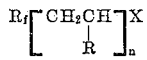

where $R_f$ is perfluorocarbon, X is selected from the class consisting of chlorine and bromine, n is an integer not greater than about 50, and R is an acylaminoalkyl group.

10. As a novel compound, a perfluorocarbon-radical-containing organic compound having the formula

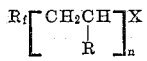

where $R_f$ is perfluorocarbon, X is selected from the class consisting of chlorine and bromine, n is an integer not greater than about 50, and R is a ketoalkyl group.

11. As a novel compound, a perfluorocarbon-radical containing organic compound having the formula

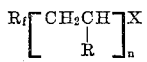

where $R_f$ is perfluorocarbon, X is selected from the class consisting of chlorine and bromine, n is an integer not greater than about 50, and R is an acyloxy group.

12. As a novel compound, a perfluorocarbon-radical-containing organic compound having the formula

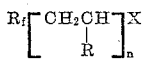

where $R_f$ is perfluorocarbon, X is selected from the class consisting of chlorine and bromine, n is an integer not greater than about 50, and R is an alkoxyalkyl group.

13. As a novel compound, a perfluorocarbon-radical-containing organic compound having the formula

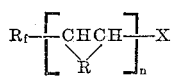

where $R_f$ is perfluorocarbon, X is selected from the class consisting of chlorine and bromine, n is an integer not greater than about 50, and R is an alkylene group.

14. As a novel compound, a perfluorocarbon-radical-containing organic compound having the formula

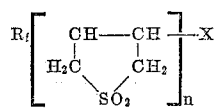

where $R_f$ is perfluorocarbon, X is selected from the class consisting of chlorine and bromine, and n is an integer not grater than about 50.

15. As a novel compound, a perfluorocarbon-radical-containing organic compound having the formula

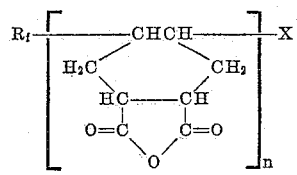

where $R_f$ is perfluorocarbon, X is selected from the class consisting of chlorine and bromine, and n is an integer not greater than about 50.

16. As a novel compound, a perfluorocarbon-radical-containing organic compound having the formula

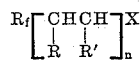

where $R_f$ is perfluorocarbon, X is selected from the class consisting of chlorine and bromine, n is an integer not greater than about 50, R is alkyl, and R' is carboxyl.

17. As a novel compound, a perfluorocarbon-radical-containing organic compound having the formula

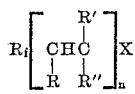

where $R_f$ is perfluorocarbon, X is selected from the class consisting of chlorine and bromine, n is an integer not greater than about 50, R and R' are alkyl, and R" is chlorine.

18. As a novel compound, a perfluorocarbon-radical-containing organic compound having the formula

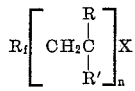

where $R_f$ is perfluorocarbon, X is selected from the class consisting of chlorine and bromine, n is an integer not greater than about 50, and R and R' are alkyl.

19. As a novel compound, a perfluorocarbon-radical-containing organic compound having the formula

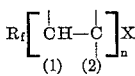

wherein $R_f$ is perfluorocarbon, X is selected from the class consisting of chlorine and bromine, n is an integer not greater than about 50, and wherein the remaining valences are satisfied by a combination of radicals having Hammett sigma (para) parameter values whose algebraic sum is not greater than about +0.4 and including at least one organic radical attached to the (2) skeletal carbon atom.

20. As a novel compound, a perfluorocarbon-radical-containing organic compound having the formula

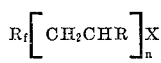

wherein $R_f$ is perfluorocarbon, X is selected from the class consisting of chlorine and bromine, n is an integer not greater than about 50, and R is a monovalent organic radical having a Hammett sigma (para) parameter value not greater than about +0.4.

References Cited in the file of this patent
UNITED STATES PATENTS
2,568,859    Ladd et al. _____ Sept. 25, 1951

UNITED STATES PATENT OFFICE
CERTIFICATE OF CORRECTION

Patent No. 2,965,659                 December 20, 1960

George V. D. Tiers

It is hereby certified that error appears in the above numbered patent requiring correction and that the said Letters Patent should read as corrected below.

Column 3, first table, under the heading, "First product, analysis, percent", first line thereof, for "$C_5H_5F_3Cl_2$" read -- $C_4H_5F_3Cl_2$ --.

Signed and sealed this 7th day of November 1961.

(SEAL)
Attest:

ERNEST W. SWIDER                    DAVID L. LADD
Attesting Officer                       Commissioner of Patents

USCOMM-DC